US010526484B2

(12) United States Patent
Adkins et al.

(10) Patent No.: US 10,526,484 B2
(45) Date of Patent: Jan. 7, 2020

(54) DITHIOCARBONATE CONTAINING POLYOLS AS POLYMER POLYOL STABILIZERS

(71) Applicants: Covestro LLC, Pittsburgh, PA (US); Covestro Deutschland AG, Leverkusen (DE)

(72) Inventors: Rick L. Adkins, Canonsburg, PA (US); Jack R. Reese, Coraopolis, PA (US); Thomas Ernst Müller, Aachen (DE); Christoph Gürtler, Köln (DE); Urs Rauwald, Düsseldorf (DE); Muhammad Afzal Subhani, Aachen (DE); Verena Jakoby, Laufenburg (DE); Burkhard Köhler, Zierenberg (DE); Walter Leitner, Aachen (DE)

(73) Assignees: Covestro LLC, Pittsburgh, PA (US); Covestro Deutschland AG, Leverkusen (DE)

( * ) Notice: Subject to any disclaimer, the term of this patent is extended or adjusted under 35 U.S.C. 154(b) by 83 days.

(21) Appl. No.: 15/848,318

(22) Filed: Dec. 20, 2017

(65) Prior Publication Data

US 2019/0185666 A1   Jun. 20, 2019

(51) Int. Cl.

| | |
|---|---|
| *C08L 75/04* | (2006.01) |
| *C08G 18/48* | (2006.01) |
| *C08J 9/228* | (2006.01) |
| *C08L 69/00* | (2006.01) |
| *C08G 75/28* | (2006.01) |
| *C08G 18/46* | (2006.01) |
| *C08G 18/76* | (2006.01) |
| *C08G 18/32* | (2006.01) |
| *C08G 18/50* | (2006.01) |
| *C08G 18/63* | (2006.01) |
| *C08G 101/00* | (2006.01) |
| *C08L 81/00* | (2006.01) |
| *C08G 18/66* | (2006.01) |

(52) U.S. Cl.
CPC .......... *C08L 75/04* (2013.01); *C08G 18/3275* (2013.01); *C08G 18/4676* (2013.01); *C08G 18/4837* (2013.01); *C08G 18/5072* (2013.01); *C08G 18/632* (2013.01); *C08G 18/7621* (2013.01); *C08G 75/28* (2013.01); *C08J 9/228* (2013.01); *C08L 69/00* (2013.01); *C08G 18/6688* (2013.01); *C08G 2101/0008* (2013.01); *C08J 2375/04* (2013.01); *C08L 81/00* (2013.01)

(58) Field of Classification Search
CPC ........... B64C 39/024; B64C 2201/145; B64C 2201/146; B64D 47/08; G01C 21/00; G01S 13/86; G01S 13/867; G01S 13/9303; G01S 13/94; G01S 19/47
See application file for complete search history.

(56) References Cited

U.S. PATENT DOCUMENTS

| | | |
|---|---|---|
| 3,073,788 A | 1/1963 | Hostettler et al. |
| 3,953,393 A | 4/1976 | Ramlow et al. |
| 4,119,586 A | 10/1978 | Shah |
| 4,148,840 A | 4/1979 | Shah |
| 4,242,249 A | 12/1980 | Van Cleve et al. |
| 4,286,074 A | 8/1981 | Davis et al. |
| 4,327,005 A | 4/1982 | Ramlow et al. |
| 4,334,049 A | 6/1982 | Ramlow et al. |
| 4,463,107 A | 7/1984 | Simroth et al. |
| 4,745,153 A | 5/1988 | Hoffman |
| 4,954,561 A | 9/1990 | Gerkin et al. |
| 4,972,002 A | 11/1990 | Volkert |
| 4,997,857 A | 3/1991 | Timberlake et al. |
| 5,011,908 A | 4/1991 | Hager |
| 5,093,412 A | 3/1992 | Mente et al. |
| 5,196,476 A | 3/1993 | Simroth |
| 5,268,418 A | 12/1993 | Simroth |
| 5,324,774 A | 6/1994 | Nishikawa et al. |
| 5,364,906 A | 11/1994 | Critchfield et al. |
| 5,428,908 A | 7/1995 | Kerfoot |
| 5,476,969 A | 12/1995 | Hinz et al. |
| 5,494,957 A | 2/1996 | Moore et al. |
| 5,554,662 A | 9/1996 | Sanders et al. |
| 5,594,066 A | 1/1997 | Heinemann et al. |
| 5,783,513 A | 7/1998 | Combs et al. |
| 5,814,699 A | 9/1998 | Kratz et al. |
| 5,854,358 A | 12/1998 | Heinemann et al. |
| 5,854,386 A | 12/1998 | Shen et al. |
| 5,990,185 A | 11/1999 | Fogg |
| 5,990,232 A | 11/1999 | Shen et al. |
| 6,013,731 A | 1/2000 | Holeschovsky et al. |

(Continued)

OTHER PUBLICATIONS

Daniel J. Keddie, "A guide to the synthesis of block copolymers using reversible-addition fragmentation chain transfer (RAFT) polymerization", Chemical Society Reviews, 2014, vol. 43, pp. 496-505.
X.-H. Zhang, F. Liu et al., "Atom-Exchange Coordination Polymerization of Carbon Disulfide and Propylene Oxide by a Highly Effective Double-Metal Cyanide Complex", Macromolecules 2008, 41, p. 1587-1590.

(Continued)

*Primary Examiner* — John M Cooney

(74) *Attorney, Agent, or Firm* — N. Denise Brown

(57) ABSTRACT

This invention relates to novel macromers containing dithiocarbonate (or xanthate) groups, novel preformed stabilizers comprising macromers, and novel polymer polyols comprising the novel macromers and/or novel preformed stabilizers. This invention also relates to processes for the preparation of these materials. Other aspects of this invention include foams comprising the novel polymer polyols and a process for preparing foam comprising the novel polymer polyols.

8 Claims, No Drawings

(56) References Cited

U.S. PATENT DOCUMENTS

| | | |
|---|---|---|
| 6,303,533 B1 | 10/2001 | Grosch et al. |
| 6,303,833 B1 | 10/2001 | Grosch et al. |
| 6,455,603 B1 | 9/2002 | Fogg |
| 6,617,413 B1 | 9/2003 | Bruchmann et al. |
| 6,624,209 B2 | 9/2003 | Kawamoto et al. |
| 6,762,274 B2 | 7/2004 | Waddington et al. |
| 7,160,975 B2 | 1/2007 | Adkins et al. |
| 7,179,882 B2 | 2/2007 | Adkins et al. |
| 7,361,695 B2 | 4/2008 | Tu et al. |
| 7,456,229 B2 | 11/2008 | Hager et al. |
| 7,572,929 B2 * | 8/2009 | Kulshrestha ......... C08G 65/334 508/445 |
| 7,759,423 B2 | 7/2010 | Chauk |
| 7,776,969 B2 | 8/2010 | Adkins |
| 8,137,754 B2 | 3/2012 | Lai et al. |
| 8,835,565 B2 | 9/2014 | England et al. |
| 9,505,881 B1 | 11/2016 | Adkins et al. |
| 2003/0187138 A1* | 10/2003 | Lai ......... C07C 329/00 525/115 |
| 2005/0009999 A1* | 1/2005 | Lai ......... C07C 329/00 525/461 |
| 2005/0043421 A1 | 2/2005 | Van Der Wal et al. |
| 2005/0085613 A1 | 4/2005 | Adkins et al. |
| 2008/0050995 A1* | 2/2008 | Lai ......... C09D 175/04 442/164 |
| 2014/0058037 A1 | 2/2014 | Petton et al. |
| 2016/0333129 A1 | 11/2016 | Hofmann et al. |

OTHER PUBLICATIONS

Darensbourg, S. J. Wilson, A. D. Young, "Oxygen/Sulfur Scrambling During the Copolymerization of Cyclopentene Oxide and Carbon Disulfide: Selectivity for Copolymer vs Cyclic [Thio]carbonates", Macromolecules 2013, 46, p. 8102-8110.

Y.-Ming Wang, Bo Li, Hui wang et al., "Cooperative catalysis with binary Lewis acid—Lewis base system for the coupling of carbon disulfide and epoxides", Applied Organometallic Chemistry, 2012, 26, p. 614-618.

* cited by examiner

DITHIOCARBONATE CONTAINING POLYOLS AS POLYMER POLYOL STABILIZERS

FIELD OF INVENTION

This invention relates to novel macromers, novel preformed stabilizers comprising the novel macromers, novel polymer polyols comprising the novel macromers or the novel preformed stabilizers, and to processes for the preparation of these materials. This invention also relates to foams prepared from these novel polymer polyols and to a process of preparing these foams.

BACKGROUND

Polymer polyols, also known as filled polyols, are viscous fluids comprising fine particles dispersed in polyols. Examples of solids used include styrene-acrylonitrile co-polymers and polyureas. The solids are typically prepared by in situ polymerization of ethylenically unsaturated monomers in the base polyol. Polymer polyols are commonly used for the production of polyurethane foams, and particularly flexible polyurethane foams.

Macromers are known and have been used to stabilize polymer polyols by co-polymerization with one or more ethylenically unsaturated monomers (such as, for example, styrene and acrylonitrile). Because of similarities in chemical composition, the polyether tail(s) energetically favor association with the polyol molecules in the continuous phase rather than with the styrene-acrylonitrile co-polymer. The polyether tails extend into the continuous phase, thereby forming a "brush" layer near the particle-fluid interface which screens the attractive van der Waals forces between particles. This phenomenon is known as steric stabilization. In order to form a brush layer which effectively screens van der Waals forces several conditions must be met. The polyether tails must be similar in chemical composition to the continuous phase so that they fully extend into the continuous phase and do not adsorb to the particles. Also, the surface coverage and molecular weight must be high enough so that the interfacial brush layer is sufficiently thick to prevent agglomeration of the solid particles.

It is known that large, bulky molecules are effective macromers because less material can be used to sterically stabilize the particles. Generally speaking, this is due to the fact that a highly branched polymer has a considerably larger excluded volume than a linear molecule (such as, e.g., a monol), and therefore less of the branched polymer is required. Coupling multi-functional polyols with polyisocyanates is also known and described in the field of polymer polyols as a suitable means to increase the molecular weight of the macromer.

Preformed stabilizers (PFS) are known to be useful for preparing polymer polyols having a lower viscosity at a high solids content. In general, a preformed stabilizer is an intermediate obtained by reacting a macromer which contains reactive unsaturation (e.g. acrylate, methacrylate, maleate, etc.) with a monomer (i.e. acrylonitrile, styrene, methyl methacrylate, etc.), optionally in a diluent or a solvent (i.e. methanol, isopropanol, toluene, ethylbenzene, polyether polyols, etc.) to give a co-polymer (dispersion having e.g. a low solids content (e.g. <20%), or soluble grafts, etc.). Thus, in the preformed stabilizer process, a macromer is reacted with monomers to form a co-polymer composed of macromer and monomers. These co-polymers comprising a macromer and monomers are commonly referred to as preformed stabilizers (PFS). Reaction conditions may be controlled such that a portion of the co-polymer precipitates from solution to form a solid. In many applications, a dispersion having a low solids content (e.g., 3 to 15% by weight) is obtained. Preferably, the reaction conditions are controlled such that the particle size is small, thereby enabling the particles to function as "seeds" in the polymer polyol reaction.

It has surprisingly been found that, by incorporating carbon disulfide into the molecule during the polyether polyol synthesis, the resulting dithiocarbonate (or xanthate) group can reduce or eliminate the amount of reactive unsaturation which is necessary in the macromer in order for the macromer to be effective in stabilizing polymer polyols and/or in forming preformed stabilizers for polymer polyols.

SUMMARY OF THE INVENTION

This invention relates to macromers containing dithiocarbonate (or xanthate) functionality. These macromers comprise the reaction product of:
(a) a polyether dithiocarbonate polyol having an equivalent weight of 230 Da to 5600 Da, and functionality of 1 to 8, having a dithiocarbonate content of from 0.05% to 20% by weight, and which comprises the copolymerization product of a reaction mixture comprising:
   (i) one or more starter polyether polyols having an equivalent weight less than 1000 Da, an OH number greater than 56 mg KOH/g polyol, and a functionality of 1 to 8,
   (ii) one or more alkylene oxides,
   and
   (iii) carbon disulfide,
   in the presence of
   (iv) an alkoxylation catalyst;
with
(b) an ethylenically unsaturated compound containing hydroxyl reactive groups;
optionally, in the presence of
(c) at least one catalyst.

The invention also relates to a process for preparing these macromers. This process comprises:
(1) reacting
   (a) a polyether dithiocarbonate polyol having an equivalent weight of 230 Da to 5600 Da, and functionality of 1 to 8, having a dithiocarbonate content of from 0.05% to 20% by weight, and which comprises the copolymerization product of a reaction mixture comprising:
      (i) one or more starter polyether polyols having an equivalent weight less than 1000 Da, an OH number greater than 56 mg KOH/g polyol, and a functionality of 1 to 8,
      (ii) one or more alkylene oxides,
      and
      (iii) carbon disulfide,
      in the presence of
      (iv) an alkoxylation catalyst;
   with
   (b) an ethylenically unsaturated compound containing hydroxyl reactive groups;
   optionally, in the presence of
   (c) at least one catalyst.

This invention also relates to preformed stabilizers. These preformed stabilizers comprise the free-radical polymerization product of:

(1) a macromer which comprises the reaction product of
  (a) a polyether dithiocarbonate polyol having an equivalent weight of 230 Da to 5600 Da, and functionality of 1 to 8, having a dithiocarbonate content of 0.05% to 20% by weight, and which comprises the copolymerization product of a reaction mixture comprising
    (i) one or more starter polyether polyols having an equivalent weight less than 1000 Da, an OH number greater than 56 mg KOH/g polyol, and a functionality of 1 to 8,
    (ii) one or more alkylene oxides, and
    (iii) carbon disulfide,
    in the presence of
    (iv) an alkoxylation catalyst;
    optionally, with
  (b) an ethylenically unsaturated compound containing hydroxyl reactive groups;
  optionally, in the presence of
  (c) at least one catalyst;
with
(2) at least one ethylenically unsaturated monomer;
in the presence of
(3) at least one free-radical polymerization initiator;
and, optionally,
(4) a liquid diluent;
and, optionally,
(5) a polymer control agent.

The invention also relates to a process for preparing preformed stabilizers. This process comprises:
(A) free-radically polymerizing
  (1) a macromer which comprises the reaction product of:
    (a) a polyether dithiocarbonate polyol having an equivalent weight of 230 Da to 5600 Da, and a functionality of 1 to 8, having a dithiocarbonate content of 0.05% to 20% by weight, and which comprises the copolymerization product of a reaction mixture comprising:
      (i) one or more starter polyether polyols having an equivalent weight less than 1000 Da, an OH number greater than 56 mg KOH/g polyol, and a functionality of 1 to 8,
      (ii) one or more alkylene oxides, and
      (iii) carbon disulfide,
      in the presence of
      (iv) an alkoxylation catalyst;
      optionally, with
    (b) an ethylenically unsaturated compound containing hydroxyl reactive groups;
    optionally, in the presence of
    (c) at least one catalyst;
  with
  (2) at least one ethylenically unsaturated monomer;
  in the presence of
  (3) at least one free-radical polymerization initiator;
  and, optionally,
  (4) a liquid diluent;
  and, optionally,
  (5) a polymer control agent.

This invention is also directed to a polymer polyol. The polymer polyols of the invention comprise the in-situ, free-radical polymerization product of:
(A) a base polyol;
(B) a component comprising at least one of:
  (1) a macromer containing dithiocarbonate functionality that comprises the reaction product of: (a) a polyether dithiocarbonate polyol having an equivalent weight of 230 Da to 5600 Da, and functionality of 1 to 8, having a dithiocarbonate content of from 0.05% to 20% by weight, and which comprises the copolymerization product of a reaction mixture comprising (i) one or more starter polyether polyols having an equivalent weight less than 1000 Da, an OH number greater than 56 mg KOH/g polyol, and a functionality of 1 to 8, (ii) one or more alkylene oxides, and (iii) carbon disulfide, in the presence of (iv) an alkoxylation catalyst; optionally, with (b) an ethylenically unsaturated compound containing hydroxyl reactive groups; and optionally, in the presence of (c) at least one catalyst;
  and
  (2) a preformed stabilizer that comprises the free-radical polymerization product of: (1) a macromer which comprises the reaction product of: (a) a polyether dithiocarbonate polyol having an equivalent weight of 230 Da to 5600 Da, and functionality of 1 to 8, having a dithiocarbonate content of 0.05% to 20% by weight, and which comprises the copolymerization product of a reaction mixture comprising (i) one or more starter polyether polyols having an equivalent weight less than 1000 Da, an OH number greater than 56 mg KOH/g polyol, and a functionality of 1 to 8, (ii) one or more alkylene oxides, and (iii) carbon disulfide, in the presence of (iv) an alkoxylation catalyst; with, optionally, (b) an ethylenically unsaturated compound containing hydroxyl reactive groups; and optionally, in the presence of (c) at least one catalyst; with (2) at least one ethylenically unsaturated monomer, in the presence of (3) at least one free-radical polymerization initiator, and, optionally, (4) a liquid diluent, and, optionally (5) a polymer control agent;
and
(C) at least one ethylenically unsaturated monomer;
in the presence of
(D) at least one free-radical polymerization initiator;
and, optionally,
(E) a polymer control agent.

This invention also relates to a process for preparing these polymer polyols. This process comprises:
(I) free-radically polymerizing:
  (A) a base polyol;
  (B) a component comprising at least one of:
    (1) a macromer containing dithiocarbonate functionality that comprises the reaction product of: (a) a polyether dithiocarbonate polyol having an equivalent weight of 230 Da to 5600 Da, and functionality of 1 to 8, having a dithiocarbonate content of from 0.05% to 20% by weight, and which comprises the copolymerization product of a reaction mixture comprising (i) one or more starter polyether polyols having an equivalent weight less than 1000 Da, an OH number greater than 56 mg KOH/g polyol, and a functionality of 1 to 8, (ii) one or more alkylene oxides, and (iii) carbon disulfide, in the presence of (iv) an alkoxylation catalyst; optionally, with (b) an ethylenically unsaturated compound containing hydroxyl reactive groups; and optionally, in the presence of (c) at least one catalyst;

and (2) a preformed stabilizer that comprises the free-radical polymerization product of: (1) a macromer which comprises the reaction product of: (a) a polyether dithiocarbonate polyol having an equivalent weight of 230 Da to 5600 Da, and functionality of 1 to 8, having a dithiocarbonate content of 0.05% to 20% by weight, and which comprises the copolymerization product of a reaction mixture comprising (i) one or more starter polyether polyols having an equivalent weight less than 1000 Da, an OH number greater than 56 mg KOH/g polyol, and a functionality of 1 to 8, (ii) one or more alkylene oxides, and (iii) carbon disulfide, in the presence of (iv) an alkoxylation catalyst; with, optionally, (b) an ethylenically unsaturated compound containing hydroxyl reactive groups; optionally, in the presence of (c) at least one catalyst; with (2) at least one ethylenically unsaturated monomer, in the presence of (3) at least one free-radical polymerization initiator, and, optionally, (4) a liquid diluent, and, optionally (5) a polymer control agent;

(C) at least one ethylenically unsaturated monomer;

in the presence of (D) at least one free-radical polymerization initiator;

and, optionally, (E) a polymer control agent.

This invention also relates to foams comprising these polymer polyols. These foams comprise the reaction product of: (I) a diisocyanate or polyisocyanate component, with (II) an isocyanate-reactive component comprising the polymer polyol described above, in the presence of (III) a catalyst, (IV) a blowing agent, and (V) a surfactant.

The invention also relates to a process for preparing foams. This process comprises reacting (I) a diisocyanate or polyisocyanate component, with (II) an isocyanate-reactive component comprising the polymer polyol described above, in the presence of (III) a catalyst, (IV) a blowing agent, and (V) a surfactant.

DETAILED DESCRIPTION OF THE INVENTION

The present invention will now be described for purposes of illustration and not limitation. Except in the operating examples, or where otherwise indicated, all numerical parameters are to be understood as being prefaced and modified in all instances by the term "about", in which the numerical parameters possess the inherent variability characteristic of the underlying measurement techniques used to determine the numerical value of the parameter. Examples of such numerical parameters include, but are not limited to OH numbers, equivalent and/or molecular weights, functionalities, amounts, percentages, etc. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. All end points of any range are included unless specified otherwise. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are inherently described in this specification such that amending to expressly recite any such sub-ranges would comply with the requirements of 35 U.S.C. § 112 and 35 U.S.C. § 132(a).

The grammatical articles "a", "an", and "the", as used herein, are intended to include "at least one" or "one or more", unless otherwise indicated, even if "at least one" or "one or more" is used in certain instances. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Equivalent weights and molecular weights given herein in Daltons (Da) are number average equivalent weights and number average molecular weights respectively, unless indicated otherwise, and were determined by GPC as described herein.

The number average and weight average, Mn and Mw, respectively, molecular weights herein were determined by gel-permeation chromatography (GPC) using a method based on DIN 55672-1, employing chloroform as the eluent with a mixed bed column (Agilent PL Gel; SDVB; 3 micron Pore diameter: 1×Mixed-E+5 micron Pore diameter: 2×Mixed-D), refractive index (RI) detection and calibrated with polyethylene glycol as the standard.

Isocyanate index is the relative stoichiometric amount of isocyanate functional groups necessary to react with the isocyanate reactive groups present in the overall foam formulation. It is expressed as a percentage in this application; thus equal stoichiometric amounts of isocyanate functional groups and isocyanate reactive functional groups in the formulation results in an isocyanate index of 100%.

The term "monomer" means the simple unpolymerized form of a chemical compound having relatively low molecular weight, e.g., acrylonitrile, styrene, methyl methacrylate, and the like.

The phrase "polymerizable ethylenically unsaturated monomer" means a monomer containing ethylenic unsaturation (>C=C<, i.e. two double bonded carbon atoms) that is capable of undergoing free radically induced addition polymerization reactions.

The term preformed stabilizer is defined as an intermediate obtained by reacting a macromer containing reactive unsaturation (e.g. acrylate, methacrylate, maleate, etc.) with one or more monomers (i.e. acrylonitrile, styrene, methyl methacrylate, etc.), with and at least one free radical initiator, in the presence of a polymer control agent (PCA) and, optionally, in a diluent, to give a co-polymer (i.e. a dispersion having e.g. a low solids content (e.g. <30%), or soluble grafts, etc.).

The term "stability" means the ability of a material to maintain a stable form such as the ability to stay in solution or in suspension. Polymer polyols having good stability generally also have good filterability.

The phrase "polymer polyol" refers to such compositions which can be produced by polymerizing one or more ethylenically unsaturated monomers dissolved or dispersed in a polyol in the presence of a free radical catalyst to form a stable dispersion of polymer particles in the polyol. These polymer polyols have the valuable property, for example, that polyurethane foams and elastomers produced therefrom exhibit higher load-bearing properties than are provided by the corresponding unmodified polyols.

As used herein, the phrase "polyol feed" refers to the amount of base polyol feed present in the polymer polyol or present in the process of preparing the polymer polyol.

As used herein, the phrase "total feed" refers to the sum of all quantities of components present in each of the various products (i.e., preformed stabilizers, polymer polyols, etc.) and/or present in the process of preparing each of the various products. The total solids levels (i.e., weight percent of polyacrylonitrile and polystyrene) of the polymer polyols were measured by an analytical technique known as near-infrared (NIR) spectroscopy. The specific NIR measurement of total solids is a variation on ASTM D6342-12, "Polyurethane Raw Materials: Determining Hydroxyl Number of Polyols by Near Infrared (NIR) Spectroscopy". The variations used include (1) substitution of the absorption bands associated with polyacrylonitrile and polystyrene instead of those associated with hydroxyl number, and (2) acquiring the NIR spectra in reflection mode rather than transmission mode. The use of reflection mode is due to polymer polyols being opaque, and thus are scattering materials with respect to infrared radiation. Measurement of the NIR spectra in reflection mode results in higher quality spectra for calibration and measurement purposes as PMPOs reflect more NIR radiation than they transmit. Calibrations to be used as standards were developed in accordance with ASTM D6342-12. In addition, the absorption bands associated with polyacrylonitrile and polystyrene are used to calculate the weight ratio of styrene:acrylonitrile in the total polymer. One skilled in the art will recognize that this is an analytical confirmation of the main mechanism for controlling the S/AN ratio, which is the wt. % of monomers in the total reactor feed.

Hydroxyl numbers or OH numbers were determined according to ASTM D4274-11, and are reported in mg[KOH]/g[polyol].

As used herein "viscosity" is in millipascal-seconds (mPa·s) measured at 25° C. The viscosity was measured on an Anton Paar SVM3000 viscometer at 25° C. that has been demonstrated to give equivalent results as can be generated with ASTM-D4878-15. The instrument was calibrated using mineral oil reference standards of known viscosity.

As used herein, the term dithiocarbonate content refers to xanthate functionality of the polyether polyol. The xanthate functionality can participate in a "living polymerization" process.

The dithiocarbonate content was determined by dissolving the sample in deuterated chloroform and run on a 400 MHz nuclear magnetic resonance (NMR) (a Varian MR400) spectrometer employing high-resolution $^1$H-NMR for characterization.

The macromers of the invention include compounds which comprise the reaction product of: (a) a polyether dithiocarbonate polyol having an equivalent weight of 230 Da to 5600 DA, a functionality of 1 to 8, and having a dithiocarbonate content of from 0.05% to 20% by weight, based on the total weight of the polyether polyol.

These polyether dithiocarbonate polyols may have an equivalent weight of at least about 230 Da, or of at least about 280 Da, or of at least about 330 Da. The equivalent weight of these polyether polyols may be 5600 Da or less, or 5400 Da or less, or 5200 Da or less. These polyether polyols may have an equivalent weight ranging between any combination of these upper and lower values, inclusive, such as, for example, from at least about 230 Da to about 5600 Da or less, or from at least about 280 Da to about 5400 Da or less, or from at least about 330 Da to about 5200 Da or less.

The functionality of these polyether dithiocarbonate polyols may be at least about 1, or at least about 2, or at least about 3. The functionality of these polyether polyols may also be 8 or less, or 7 or less, or 6 or less. In general, these polyether polyols may have a functionality ranging between any combination of these upper and lower values, inclusive, such as, for example, from at least about 1 to about 8 or less, or from at least about 2 to about 7 or less, or from at least about 3 to about 6 or less.

These polyether dithiocarbonate polyols may have a dithiocarbonate content of at least about 0.05% by weight, or of at least about 0.10% by weight, or of at least about 0.15% by weight. The dithiocarbonate content of these polyether polyols may be 20% by weight or less, or 15% by weight or less, or 10% by weight or less. These polyether dithiocarbonate polyols may have a dithiocarbonate content ranging between any combination of these upper and lower values, inclusive, such as, for example, from at least about 0.05% by weight to about 20% by weight or less, or from at least about 0.10% to about 15% by weight or less, or from at least about 0.15% to about 10% by weight or less, based on 100% by weight of the polyether polyol.

These dithiocarbonate containing polyether polyols comprise the copolymerization product of a reaction mixture which comprises: (i) one or more starter polyether polyols having an equivalent weight less than 1000 Da, an OH number greater than 56 mg KOH/g polyol, and a functionality of 1 to 8, (ii) one or more alkylene oxides, and (iii) carbon disulfide, in the presence of (iv) an alkoxylation catalyst.

Suitable starter polyether polyols (i) have an equivalent weight less than or equal to 1000 Da, or less than or equal to 500 Da, or less than or equal to 250 Da. The equivalent weight of the starter polyether polyols is also typically at least 30 Da, or at least 100 Da, or at least 150 Da. The suitable starter polyether polyols will, in general, have an equivalent weight ranging between any combination of these upper and lower values, inclusive, such as, for example, of 30 Da to less than or equal to 1000 Da, or 100 Da to less than or equal to 500 Da, or 150 Da to less than or equal to 250 Da.

The starter polyether polyols (i) may have an OH number of at least 56 mg KOH/g polyol, or at least 112 mg KOH/g polyol, or at least 220 mg KOH/g polyol. These starter polyether polyols may also have an OH number less than or equal to 1850 mg KOH/g polyol, or less than or equal to 560 mg KOH/g polyol or less than or equal to 400 mg KOH/g polyol. In general, the starter polyether polyols (i) will have an OH number ranging between any combination of these upper and lower values, inclusive, such as, for example, of at least 56 mg KOH/g polyol to less than or equal to 1850 mg KOH/g polyol, or at least 112 mg KOH/g polyol to less than or equal to 560 mg KOH/g polyol, or at least 220 mg KOH/g polyol to less than or equal to 400 mg KOH/g polyol.

The functionality of these starter polyether polyols (i) may be at least about 1, or at least about 2, or at least about 3. The functionality of these starter polyether polyols (i) may also be 8 or less, or 7 or less, or 6 or less. In general, these starter polyether polyols (i) may have a functionality ranging between any combination of these upper and lower values, inclusive, such as, for example, from at least about 1 to about 8 or less, or from at least about 2 to about 7 or less, or from at least about 3 to about 6 or less.

Suitable starter polyether polyols include, for example, polyoxyethylene monols, glycols, triols, tetrols and higher functionality polyols, polyoxypropylene monols, glycols, triols, tetrols and higher functionality polyols, mixtures thereof, etc. When mixtures of alkylene oxides are used, the ethylene oxide and propylene oxide, for example, may be added simultaneously or sequentially to provide internal blocks, terminal blocks or random distribution of the oxyethylene groups and/or oxypropylene groups in the polyether polyol. Suitable starters or initiators for these polyether polyols include, for example, 1-butanol, ethylene glycol, propylene glycol, diethylene glycol, dipropylene glycol, tripropylene glycol, trimethylolpropane, glycerol, pentaerythritol, sorbitol, sucrose, ethylenediamine, toluene diamine, etc. Suitable alkylene oxides include ethylene oxide, propylene oxide, butylene oxide, styrene oxide, etc. By alkoxylation of the starter, a suitable starter polyether polyol can be formed. The suitable starter polyether polyols are free of dithiocarbonate groups.

Suitable alkylene oxides to be reacted with the starter polyether polyols include, for example, ethylene oxide, propylene oxide, butylene oxide, styrene oxide, epichlorohydrin, etc. In an embodiment of the invention, the alkylene oxides comprise ethylene oxide, propylene oxide and/or mixtures thereof. When used as a mixture, the ethylene oxide content can vary from 2% to 50% by weight of the total oxide feed, and can be utilized as a block, a random co-feed, or as a "cap" to give high primary hydroxyl containing polyols.

Carbon disulfide is also reacted with the starter polyether polyols and alkylene oxides in the present of an alkoxylation catalyst to form the polyether polyols useful as macromers in accordance with the present invention.

Suitable alkoxylation catalysts (iv) to be used to obtain the polyether dithiocarbonate polyols (a) include catalysts such as, basic catalysts including, for example, potassium hydroxide, sodium hydroxide, cesium hydroxide, etc., and double metal cyanide catalysts including amorphous and non-amorphous DMC catalysts.

Suitable ethylenically unsaturated compounds containing hydroxyl reactive groups to be used as component (b) of the macromers include, for example, methyl methacrylate, ethyl methacrylate, maleic anhydride, 3-isopropenyl-α,α-dimethyl benzyl isocyanate, 2-isocyanatoethyl methacrylate, adducts of isophorone diisocyanate and 2-hydroxyethyl methacrylate, adducts of toluenediisocyanate and 2-hydroxypropyl acrylate, etc.

Suitable catalysts (c) for the macromers herein include virtually any catalyst known to be suitable for urethane reactions can be used as component (c) in the present invention. Suitable polyurethane catalysts are well known in the art; an extensive list appears in U.S. Pat. No. 5,011,908, the disclosure of which is herein incorporated by reference. Suitable organotin catalysts include tin salts and dialkyltin salts of carboxylic acids. Examples include stannous octoate, dibutyltin dilaurate, dibutyltin diacetate, stannous oleate, and the like. Also catalysts such as bismuth(III) neodecanoate.

In the process for preparing the macromer, the polyether dithiocarbonate polyol (a) is typically reacted optionally, with (b) the ethylenically unsaturated compound containing hydroxyl reactive groups, optionally, in the presence of (c) at least one catalyst, at temperatures of about 25° C. to about 250° C. for time periods of from about 1 to about 10 hours. It is preferred that this reaction is at temperatures of about 60° C. to about 200° C. for a time of from about 2 to about 7 hours.

The preformed stabilizers herein comprise the free-radical polymerization product of: (1) a macromer as described herein, with (2) at least one ethylenically unsaturated monomer, in the presence of (3) at least one free-radical polymerization initiator and, optionally, (4) a liquid diluent, and, optionally, (5) a polymer control agent.

With respect to the preformed stabilizers and to the process of making these in accordance with the present invention, the (1) macromers are as described herein. In one embodiment, the macromers (1) may comprise (a) a polyether dithiocarbonate polyol having an equivalent weight of 230 Da to 5600 Da, a functionality of 1 to 8 and a dithiocarbonate content of from 0.05 to 20% by weight, and which comprises the copolymerization product of a reaction mixture comprising (i) one or more starter polyether polyols having an equivalent weight less than 1000 Da, an OH number greater than 56 mg KOH/g polyol and functionality of 1 to 8, (ii) an alkylene oxide, with (iii) carbon disulfide, in the presence of (iv) an alkoxylation catalyst; optionally with (b) an ethylenically unsaturated compound containing hydroxyl reactive groups; optionally in the presence of (c) a catalyst.

In one embodiment, the suitable ethylenically unsaturated compound containing hydroxyl reactive groups for (b) in the macromer (1) comprises a compound selected from the group consisting of methyl methacrylate, ethyl methacrylate, maleic anhydride, 3-isopropenyl-α,α-dimethyl benzyl isocyanate, 2-isocyanatoethyl methacrylate, adducts of isophorone diisocyanate and 2-hydroxyethyl methacrylate, adducts of toluenediisocyanate and 2-hydroxypropyl acrylate, etc.

Suitable (2) ethylenically unsaturated monomers for the preformed stabilizers of the invention include, for example, aliphatic conjugated dienes such as butadiene and isoprene; monovinylidene aromatic monomers such as styrene, α-methylstyrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitably employed in making the preformed stabilizer. Of the above monomers, the monovinylidene aromatic monomers, particularly styrene, and the ethylenically unsaturated nitriles, particularly acrylonitrile are preferred.

When using a mixture of monomers, it is preferred to use a mixture of two monomers. These monomers are typically used in weight ratios of from 80:20 (styrene:acrylonitrile) to 20:80 (S:AN), or from 75:25 (S:AN) to 25:75 (S:AN).

Suitable free-radical polymerization initiators (3) for preformed stabilizer include, for example, peroxides including both alkyl and aryl hydroperoxides, alkyl and aryl peroxides, peresters, persulfates, perborates, percarbonates, azo compounds, etc. Some specific examples include catalysts such as hydrogen peroxide, di(t-butyl)-peroxide, t-butylperoxy diethyl acetate, t-butyl peroctoate, t-butyl peroxy isobutyrate, 1,1-di(t-butylperoxy)cyclohexane, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, 1,1-di(t-amylperoxy)cyclohexane, lauroyl peroxide, cumene hydroperoxide, t-butyl hydroperoxide, azobis (isobutyronitrile), 2,2'-azo bis-(2-methylbutyronitrile), etc.

Suitable catalysts concentrations range from about 0.01 to about 2% by weight, or from about 0.05 to 1% by weight, and or from 0.05 to 0.3% by weight, based on the total weight of the components (i.e. 100% by weight of the combined weight of the macromer, the ethylenically unsaturated monomer, the free-radical polymerization initiator and, optionally the liquid diluent and/or the chain transfer agent.

Suitable diluents (4) for the preformed stabilizers of the present invention include, for example, compounds such as monols (i.e., monohydroxy alcohols), polyols, hydrocarbons, ethers etc., and mixtures thereof. Suitable monols include all alcohols which contain at least one carbon atom, such as, for example, methanol, ethanol, n-propanol, isopropanol, n-butanol, sec.-butanol, tert-butanol, n-pentanol, 2-pentanol, 3-pentanol, etc. and mixtures thereof. A preferred monol is isopropanol.

Suitable polyols to be used as a diluent (4) comprise, for example, poly(oxypropylene) glycols, triols and higher functionality polyols. Such polyols include poly(oxypropylene-oxyethylene) polyols; however, desirably the oxyethylene content should comprise less than about 50% of the total and, preferably less than about 30%. The ethylene oxide can be incorporated in any fashion along the polymer chain. Stated another way, the ethylene oxide can be either incorporated in internal blocks, as terminal blocks, or may be randomly distributed along the polymer chain. It is well known in the art that polyols contain varying amounts of non-induced unsaturation. The extent of unsaturation does not affect in any adverse way the formation of the polymer polyols in accordance with the present invention.

For purposes of the present invention, useful polyols should have a number average molecular weight of about 400 Da or greater, the number average being used herein being the theoretical, hydroxyl number derived value. The true number average molecular weight may be somewhat less, depending upon the extent to which the true molecular functionality is below the starting or theoretical functionality.

The polyols employed can have hydroxyl numbers which vary over a wide range. In general, the hydroxyl numbers of the polyols employed in the invention can range from about 20 mg KOH/g polyol and lower, to about 280 mg KOH/g polyol and higher. The hydroxyl number is defined as the number of milligrams of potassium hydroxide required for the complete hydrolysis of the fully phthalated derivative prepared from 1 gram of polyol. The hydroxyl number can also be defined by the equation:

$$OH = (56.1 \times 1000 \times f)/m.w.$$

where:
OH=hydroxyl number of the polyol;
f=functionality, that is, average number of hydroxyl groups per molecule of the polyol;
and
m.w.=molecular weight of the polyol.

The exact polyol employed depends upon the end use of the polyurethane product to be produced. The molecular weight or the hydroxyl number is selected properly to result in the desired foam processing and/or physical properties when the polymer polyol produced from the polyol is converted to a polyurethane. The polyols preferably possess a hydroxyl number of from about 50 mg KOH/g polyol to about 150 mg KOH/g polyol for semi-flexible foams and from about 25 mg KOH/g polyol to about 70 mg KOH/g polyol for flexible foams. Such limits are not intended to be restrictive, but are merely illustrative of the large number of possible combinations of the above polyol co-reactants.

Preferred polyol components to be used as diluents in the present invention typically include, for example, the alkylene oxide adducts of suitable starter materials having 4 or more hydroxyl groups such as, for example, pentaerythritol, sorbitol, diether of sorbitol, mannitol, diether of mannitol, arabitol, diether of arabitol, sucrose, oligomer of polyvinyl alcohol or glycidol, mixtures thereof, etc.

When using a mixture of a monol and a polyol as the diluent for the preformed stabilizer, the polyol preferably comprises only a minor amount of the diluent and the monol comprises a major amount. In general, the polyol will comprise less than 30 weight percent of the diluent, preferably less than about 20 weight percent, and most preferably less than about 15 weight percent. The amount of the polyol component present in the diluent is below the concentration at which gelling occurs in the preformed stabilizer.

Generally, the quantity of diluent is >40% by weight, based on 100% by weight of the PFS (preformed stabilizer).

Polymer control agents (5) may also be present in the preformed stabilizers of the present invention and the process of making the preformed stabilizers. Suitable polymer control agents for this aspect of the present invention include, for example, isopropanol, ethanol, tert-butanol, toluene, ethylbenzene, triethylamine, dodecylmercaptan, octadecylmercaptan, carbon tetrachloride, carbon tetrabromide, chloroform, methylene chloride. Polymer control agents are also commonly referred to as molecular weight regulators. These compounds are employed in conventional amounts to control the molecular weight of the copolymerizate.

Suitable processes for preparing the preformed stabilizers are similar to known methods described in, for example, U.S. Pat. Nos. 5,196,476, 5,268,418, and 7,759,423, the disclosures of which are herein incorporated by reference. In general, the process of preparing the preformed stabilizer is similar to the process of preparing the polymer polyol. The temperature range is not critical and may vary from about 80° C. to about 150° C. or higher, and preferably from about 115° C. to about 125° C. or so. The catalyst and temperature should be selected such that the catalyst has a reasonable rate of decomposition with respect to the hold-up time in the reactor for a continuous flow reactor or the feed time for a semi-batch reactor.

Mixing conditions employed in this process are obtained by using a back mixed reactor (e.g. a stirred flask or stirred autoclave). The reactors of this type keep the reaction mixture relatively homogeneous and so prevent localized high monomer to macromer ratios such as occur in tubular reactors, where all of the monomer is added at the beginning of the reactor. In addition, more efficient mixing can be obtained by the use of an external pump around loop on the reactor section. For instance, a stream of reactor contents may be removed from the reactor bottom via external piping and returned to the top of the reactor (or vice versa) in order to enhance internal mixing of the components. This external loop may contain a heat exchanger if desired.

The combination of conditions selected for the preparation of the preformed stabilizer should not lead to cross-linking or gel formation in the preformed stabilizer which can adversely affect the ultimate performance in preparing the polymer polyol composition. Combinations of too low a diluent concentration, too high a precursor and/or monomer concentration, too high a catalyst concentration, too long of a reaction time, and too much unsaturation in the precursor can result in ineffective preformed stabilizer from cross-linking or gelling.

Particularly preferred processes of preparing the preformed stabilizers herein are those as described in, for example, U.S. Pat. Nos. 5,196,476 and 5,268,418, the disclosures of which are hereby incorporated by reference. Preferred diluents and relative concentrations, ethylenically unsaturated monomers and relative concentrations, free-radical initiators and relative concentrations, and process conditions set forth in the references U.S. Pat. Nos. 5,196,476, 5,268,418 and 7,759,423.

It is evident that the macromers of the present invention differ from the macromers described by these references, and thus result in structurally different preformed stabilizers.

The polymer polyols of the present invention comprise the in-situ, free-radical polymerization product of (A) a base polyol, (B) a component selected from the group consisting of (1) a macromer as described herein and (2) a preformed stabilizer as described herein, and (C) one or more ethylenically unsaturated monomers in the presence of (D) at least one free-radical initiator, and optionally, (E) a polymer control agent, and the process for the preparation of polymer polyols comprises free-radically polymerizing these components. The resultant polymer polyols exhibit high solids contents, i.e., from 20 to 70% by weight, based on the total weight of the resultant polymer polyol. In general, the solids content of the polymer polyols may typically be at least about 20% by weight, or at least about 30% by weight, or at least about 40% by weight. Typically, the solids content of the polymer polyols will also typically be about 70% by weight or less, or about 60% by weight or less, or about 55% by weight or less. In general, these polymer polyols may have a solids content ranging between any combination of these upper and lower values, inclusive, such as, for example, from 20 to 70% by weight, or from about 30 to 60% by weight or from about 40 to 55% by weight. These polymer polyols also exhibit good viscosities, i.e. from about 1000 to about 15,000 mPa·s. In general, these polymer polyols may have viscosities of at least about 1000 mPa·s, or at least about 4000 mPa·s. The polymer polyols may also have viscosities of about 15,000 mPa·s or less, or about 10,000 mPa·s or less. In general, the polymer polyols may have viscosities ranging between any combination of these upper and lower values, inclusive, such as, for example, from 1000 to 15,000 mPa·s, or from 4,000 to 10,000 mPa·s. Polymer polyols of the present invention also typically have good filterability.

Suitable base polyols (A) for this aspect of the present invention include, for example, base polyols such as, for example, polyether polyols. Suitable polyether polyols include those having a functionality of at least about 2, or at least about 3. The functionality of suitable polyether polyols is less than or equal to about 8, or less than or equal to about 6. The suitable polyether polyols may also have functionalities ranging between any combination of these upper and lower values, inclusive, such as, for example at least about 2 to about 8, or at least about 3 to about 6. The OH numbers of suitable polyether polyols is at least about 10 mg KOH/g polyol, preferably at least about 15 mg KOH/g polyol, and most preferably at least about 20 mg KOH/g polyol. Polyether polyols typically also have OH numbers of less than or equal to about 180 mg KOH/g polyol, preferably less than or equal to about 100 mg KOH/g polyol, and most preferably less than or equal to about 70 mg KOH/g polyol. The suitable polyether polyols may also have OH numbers ranging between any combination of these upper and lower values, inclusive, such as, for example, at least 10 mg KOH/g polyol to about 180 mg KOH/g polyol or less, or at least about 15 mg KOH/g polyol to about 100 mg KOH/g polyol or less, or at least about 20 mg KOH/g polyol to about 70 mg KOH/g polyol or less. The (number average) molecular weight of suitable polyether polyols is typically at least about 600 Da, or at least about 2,000 Da or at least about 3,000 Da. Polyether polyols typically have (number average) molecular weights of less than or equal to 15,000 Da, or less than or equal to 12,000 Da, or less than or equal to 8,000 Da. The suitable polyether polyols may also have (number average) molecular weights ranging between any combination of these upper and lower values, inclusive, such as, for example, at least about 600 Da to about 15,000 Da or less, or at least about 2000 Da to about 12,000 Da or less, or at least about 3000 Da to about 8000 Da or less.

Examples of such compounds include polyoxyethylene glycols, triols, tetrols and higher functionality polyols, polyoxypropylene glycols, triols, tetrols and higher functionality polyols, mixtures thereof, etc. When mixtures as used, the ethylene oxide and propylene oxide may be added simultaneously or sequentially to provide internal blocks, terminal blocks or random distribution of the oxyethylene groups and/or oxypropylene groups in the polyether polyol. Suitable starters or initiators for these compounds include, for example, ethylene glycol, propylene glycol, diethylene glycol, dipropylene glycol, tripropylene glycol, trimethylolpropane, glycerol, pentaerythritol, sorbitol, sucrose, ethylenediamine, toluene diamine, etc. By alkoxylation of the starter, a suitable polyether polyol for the base polyol component can be formed.

Other suitable base polyols for the present invention include alkylene oxide adducts of non-reducing sugars and sugar derivatives, alkylene oxide adducts of phosphorus and polyphosphorous acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-di-hydroxybutane, 1,4-dihydroxybutane, 1,4-, 1,5- and 1,6-dihydroxyhexane, 1,2-, 1,3-, 1,4-1,6- and 1,8-dihydroxyoctant, 1,10-dihydroxydecane, glycerol, 1,2,4-tirhydroxybutane, 1,2,6-trihydroxyhexane, 1,1,1-trimethyl-olethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference.

Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris(hydroxy-phenyl)propanes, condensation products of various phenolic compounds and glyoxal, glutaraldehyde, other dialdehydes, including the 1,1,2,2-tetrakis (hydroxyphenol)ethanes, etc.

The alkylene oxide adducts of phosphorus and polyphosphorous acid are also useful polyols. These include ethylene oxide, 1,2-epoxy-propane, the epoxybutanes, 3-chloro-1,2-epoxypropane, etc. as preferred alkylene oxides. Phosphoric acid, phosphorus acid, the polyphosphoric acids such as, tripolyphosphoric acid, the polymetaphosphoric acids, etc. are desirable for use herein.

Suitable components for (B) are selected from the group consisting of (1) macromers as described herein and (2) preformed stabilizers as described herein above.

The (C) ethylenically unsaturated monomers suitable for the polymer polyols of the present invention and the process of preparing these include those ethylenically unsaturated monomers described above with respect to the preparation of the preformed stabilizer. Other suitable monomers include, for example, aliphatic conjugated dienes such as butadiene and isoprene; monovinylidene aromatic monomers such as styrene, α-methyl-styrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitably employed in making the preformed stabilizer. Of the above monomers, the monovinylidene aromatic monomers, particularly styrene, and the ethylenically unsaturated nitriles, particularly acrylonitrile, are preferred. In accordance with this aspect of the present invention, it is preferred that these ethylenically unsaturated monomers include styrene and its derivatives, acrylonitrile, methyl acrylate, methyl methacrylate, vinylidene chloride, with styrene and acrylonitrile being particularly preferred monomers.

It is preferred styrene and acrylonitrile are used in sufficient amounts such that the weight ratio of styrene to acrylonitrile (S:AN) may is from about 80:20 to 20:80, more preferably from about 75:25 to 25:75. These ratios are suitable for polymer polyols and the processes of preparing them, regardless of whether they comprise the ethylenically unsaturated macromers or the preformed stabilizers of the present invention.

Overall, the quantity of ethylenically unsaturated monomer(s) present in the polymer polyols comprising a preformed stabilizer is at least about 20% by weight, based on 100% by weight of the polymer polyol. In an embodiment, the solids content is from about 20 to about 70% by weight. Typically, the solids contents of polymer polyols comprising a preformed stabilizer may range between any combination of these upper and lower values, inclusive, such as, for example, from about 20 to about 70% by weight, or from about 30 to about 60% by weight, or from about 40 to about 55% by weight.

Overall, the quantity of ethylenically unsaturated monomer(s) present in the polymer polyols comprising the macromers of the present invention is at least about 20% by weight, based on 100% by weight of the polymer polyol. In an embodiment, the solids content ranges from about 20 to about 70% by weight.

Suitable free-radical initiators include those as described previously for the preparation of the preformed stabilizers. Among the useful initiators are those catalysts having a satisfactory half-life within the temperature ranges used in forming the stabilizer, i.e. the half-life should be about 25% or less of the residence time in the reactor at any given time. Preferred initiators for this portion of the invention include acyl peroxides such as didecanoyl peroxide and dilauroyl peroxide, alkyl peroxides such as t-butyl peroxy-2-ethylhexanoate, 1,1-di(t-butylperoxy)cyclohexane, 1,1-di(t-amylperoxy)cyclohexane, t-butylperoxypivalate, t-amyl peroctoate, t-amylperoxypivalate, 2,5-dimethyl-hexane-2,5-diper-2-ethyl hexoate, t-butyl perneodecanoate, t-butylperbenzoate and 1,1-dimethyl-3-hydroxybutyl peroxy-2-ethylhexanoate, and azo catalysts such as azobis (isobutyro-nitrile), 2,2'-azo bis-(2-methoxylbutyronitrile), and mixtures thereof. Most preferred are the acyl peroxides described above and the azo catalysts.

The quantity of initiator used herein is not critical and can be varied within wide limits. In general, the amount of initiator ranges from about 0.01 to 2% by weight, based on 100% by weight of the final polymer polyol. Increases in catalyst concentration result in increases in monomer conversion up to a certain point, but past this, further increases do not result in substantial increases in conversion. The particular catalyst concentration selected will usually be an optimum value, taking all factors into consideration including costs.

Suitable polymer control agents include, for example, one or more monol which is typically an alcohol containing at least one carbon atom, such as methanol, ethanol, n-propanol, iso-propanol, n-butanol, sec.-butanol, t-butanol, n-pentanol, 2-pentanol, 3-pentanol, allyl alcohol, and the like, and mixtures of the same. The preferred monol is isopropanol. Other known polymer control agents include compounds such as, for example, ethylbenzene and toluene. In accordance with the present invention, the most preferred polymer control agents include isopropanol, ethanol, tert-butanol, toluene, ethylbenzene, etc.

Polymer control agents can be used in substantially pure form (i.e. as commercially available) or can be recovered in crude form from the polymer polyol process and reused as-is. For instance, if the polymer control agent is isopropanol, it can be recovered from the polymer polyol process and used at any point in a subsequent product campaign in which the isopropanol is present (i.e. such as the production of PFS A and PFS B in Table 1 of U.S. Pat. No. 7,179,882, the disclosure of which is hereby incorporated by reference). The amount of crude polymer control agent in the total polymer control agent can range anywhere from 0% up to 100% by weight.

Polymer polyols comprising the preformed stabilizers of the present invention are prepared by utilizing the processes as disclosed in, for example, U.S. Pat. Nos. 4,148,840, 4,242,249, 4,954,561, 4,745,153, 5,494,957, 5,990,185, 6,455,603, 4,327,005, 4,334,049, 4,997,857, 5,196,476, 5,268,418, 5,854,386, 5,990,232, 6,013,731, 5,554,662, 5,594,066, 5,814,699 and 5,854,358, the disclosures of which are herein incorporated by reference. As described therein, a low monomer to polyol ratio is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semi-batch operation, also by slowly adding the monomers to the polyol.

In the process of preparing polymer polyols, the temperature range is not critical, and may vary from about 100° C. to about 140° C. or perhaps greater, the preferred range being from 115° C. to 125° C. As has been noted herein, the catalyst and temperature should be selected such that the catalyst has a reasonable rate of decomposition with respect to the hold-up time in the reactor for a continuous flow reactor or the feed time for a semi-batch reactor.

The mixing conditions employed are those obtained using a back-mixer (e.g., a stirred flask or stirred autoclave). The reactors of this type keep the reaction mixture relatively homogeneous and so prevent localized high monomer to polyol ratios such as occur in tubular reactors when such reactors are operated with all the monomer added to the beginning of the reactor. In addition, more efficient mixing can be obtained by the use of an external pump around loop on the reactor section. For instance, a stream of reactor contents may be removed from the reactor bottom via external piping and returned to the top of the reactor (or vice versa) in order to enhance internal mixing of the components. This external loop may contain a heat exchanger if desired.

The utilization of the processes as described in U.S. Pat. Nos. 5,196,476 and 5,268,418 are preferred in this aspect of the present invention since these allow for the preparation of polymer polyols with a wide range of monomer compositions, polymer contents and polymer polyols that could not be otherwise prepared with the necessary requisite stability. However, whether the utilization of the processes disclosed in U.S. Pat. Nos. 5,916,476 and 5,268,418 are essential depends on whether the process parameters are such that a satisfactory polymer polyol can be prepared without using either of these processes.

The polymer polyols of the present invention comprise dispersions in which the polymer particles (the same being either individual particles or agglomerates of individual particles) are relatively small in size and, in the preferred embodiment, are all essentially less than about one to three microns. However, when high contents of styrene are used, the particles will tend to be larger; but the resulting polymer polyols are higher useful, particularly when the end use application requires as little scorch as possible. In the preferred embodiment, essentially all of the product (i.e., about 99% or more) will pass through the filter employed in the filtration hindrance (filterability) test that will be described in conjunction with the Examples, This insures that the polymer polyol products can be successfully processed in all types of the relatively sophisticated machine systems now in use for large volume production of polyurethane products, including those employing impingement-type mixing which necessitate the use of filters that cannot tolerate any significant amount of relatively large particles. Less rigorous applications are satisfied when about 50% of the product passes through the filter. Some applications may also find useful products in which only about 20% or even less passes through the filter. Accordingly, the polymer polyols of the present invention desirably contemplate the products in which only 20% pass through the filter, preferably at least 50%, and most preferably, at least 95%.

In accordance with the present invention, the stabilizer is present in an amount sufficient to insure that satisfactory stabilization will result in the desired filtration hindrance, centrifugible solids level and viscosity. In this regard, the quantity of preformed stabilizer generally ranges from about 1 to about 20% by weight, based on the total feed. In general, the quantity of preformed stabilizer may range between any combination of these upper and lower values, inclusive, such as, for example, from about 1 to about 20% by weight, of from about 2 to about 15% by weight, based on the total feed. As one skilled in the art knows and understands, various factors including, for example, the free-radical initiator, the solids content, the weight ratio of S:AN, process conditions, etc., will affect the optimum quantity of preformed stabilizer.

Should it be desirable not to use a preformed stabilizer, then the macromer can be utilized in the polymer polyol process at any level between 0.5% and 30%, based on the total weight of the polymer polyol. The macromer is typically used in the polymer polyol process in an amount of at least about 0.5%, or at least about 1%, or at least about 2% by weight The macromer is also typically used in the polymer polyol process in an amount of about 30% by weight or less, or of about 20% by weight or less, or of about 15% by weight or less. In general, the amount of macromer used in the polymer polyol process can range between any combination of these upper and lower values, inclusive, such as, for example, from about 0.5% to about 30% by weight, or from about 1% to about 20% by weight, or from about 2% to about 15% by weight.

Polyurethanes, preferably polyurethane foams, comprising the in-situ formed polymer polyols and processes for the production of these polymer polyols are also part of the present invention. Suitable in-situ formed polymer polyols for these polyurethanes may be either those prepared directly from the inventive macromers, or those prepared from preformed stabilizers which are based on the inventive macromers. These polyurethanes comprise the reaction product of a polyisocyanate component or prepolymer thereof, with an isocyanate-reactive component comprising the polymer polyols of the invention. The processes for preparing these polyurethanes comprise reacting a polyisocyanate component or prepolymer thereof, with an isocyanate-reactive component comprising the polymer polyols of the present invention.

In another aspect of the present invention, flexible polyurethane foams comprise the reaction product of a polyisocyanate component, with an isocyanate-reactive component which comprises the novel in-situ formed polymer polyols described herein, in the presence of one or more catalysts, one or more blowing agents, and optionally, one or more surfactants. In addition, the isocyanate-reactive component may additionally comprise one or more crosslinking agents, one or more chain extenders, and/or one or more polyether polyols containing a high ethylene oxide content. It is also possible that the isocyanate-reactive component additionally comprises one or more polyoxyalkylene polyols, polyether polyols, polyester polyols, polycarbonate ether polyols, polythioethers, polycarbonates, polyacetals, etc., and mixtures thereof. Various additives and/or auxiliary agents which are known to be useful in preparing foams may also be present.

The process of preparing the flexible polyurethane foams comprises reacting (I) a polyisocyanate component, with (II) an isocyanate-reactive component comprising the novel polymer polyols described herein, in the presence of (III) one or more catalysts, (IV) one or more blowing agents and, optionally, (V) one or more surfactants. In addition, crosslinking agents, chain extenders, other isocyanate-reactive components, etc., as described herein above, as well as various other additives and auxiliary agents may also be present.

Suitable polyisocyanates for (I) the polyisocyanate component comprise those known in the art, to be suitable for the preparation of flexible polyurethane foams. The polyisocyanates may be di- or poly-functional, and include, for example, (cyclo)aliphatic di- and/or polyisocyanates, aromatic di- and/or polyisocyanates, and araliphatic di- and/or polyisocyanates. Some specific examples of suitable aromatic polyisocyanates and aromatic diisocyanates include compounds such as toluene diisocyanate, diphenylmethane diisocyanate, polymethylene polyphenyl polyisocyanate, etc., and mixtures or blends thereof.

Suitable compounds to be used as component (II), the isocyanate-reactive component, herein for the preparation of flexible polyurethane foams include the novel in-situ formed polymer polyols described herein. In accordance with the present invention, the isocyanate-reactive component (II) may additionally comprise a conventional (i.e. non-solids containing) isocyanate-reactive component such as, for example, a polyoxyalkylene polyol, a polyether polyol, a polyester polyol, a polythioether, a polyacetal, a polycarbonate, a polycarbonate ether polyol, etc., and mixtures thereof. These isocyanate-reactive compounds having a functionality of from 2 to 8, or from 2 to 6, or from 2 to 4, and a (number average) molecular weight of from 1000 Da to 12,000 Da, or from 1000 Da to 8,000 Da, or from 2000 Da to 6000 Da. In addition, lower molecular weight isocyanate-reactive components such as crosslinkers and/or chain extenders may be used. These lower molecular weight isocyanate-reactive components include chain extenders which may have functionalities of 2 and (number average) molecular weights ranging from 61 Da to 500 Da; and crosslinking agents which may have functionalities of 3 to 4 and (number average) molecular weights ranging from 92 Da to less than 1000 Da, or from 92 Da to less than or equal to 750 Da. Examples of suitable chain extenders include ethylene glycol, 2-methyl-1,3-propanediol, 1,2- and 1,3-propanediol, 1,3- and 1,4- and 2,3-butanediol, 1,6-hexanediol, diethylene glycol, triethylene glycol, dipropylene glycol, etc., and mixtures thereof, and alkylene oxide adducts thereof. Some examples of suitable crosslinking agents include glycerol, trimethylolpropane, pentaerythritol, diethanolamine, triethanolamine, etc., mixtures thereof, and alkylene oxide adducts thereof. It is also possible to use a polyether polyol that contains a high ethylene oxide content.

At least one polyurethane catalyst is required to catalyze the reactions of the monol, polyols and water with the polyisocyanate. It is common to use an organoamine and/or an organotin compound for this purpose. Suitable polyurethane catalysts are well known in the art; an extensive list appears in U.S. Pat. No. 5,011,908, the disclosure of which is herein incorporated by reference. Suitable organotin catalysts include tin salts and dialkyltin salts of carboxylic acids. Examples include stannous octoate, dibutyltin dilaurate, dibutyltin diacetate, stannous oleate, and the like. Suitable organoamine catalysts are tertiary amines such as trimethylamine, triethylamine, triethylenediamine, bis(2,2'-dimethylamino)ethyl ether, N-ethylmorpholine, diethylenetriamine, and the like. Preferred catalysts are amine catalysts such as, for example, bis(dimethylaminoethyl)ether in dipropylene glycol and triethylene diamine in dipropylene glycol. These are commercially available as Niax A-1 and Niax A-33, respectively.

The polyurethane catalysts are typically used in an amount within the range of about 0.05 to about 3 parts, or from about 0.1 to about 2 parts, per 100 parts of isocyanate-reactive mixture.

Suitable (III) blowing agents for the present invention include, for example chemical blowing agents and/or physical blowing agents. Some examples of the suitable blowing agents for the present invention include water, formic acid, carbon dioxide, chlorofluorocarbons, highly fluorinated and/or perfluorinated hydrocarbons, chlorinated hydrocarbons, aliphatic and/or cycloaliphatic hydrocarbons such as propane, butane, pentane, hexane, etc., or acetals such as methylal, etc. It is possible to use a mixture of blowing agent in the present invention. When using a physical blowing agent, this is typically added to the isocyanate-reactive component of the system. These can, however, also be added in the polyisocyanate component or to a combination of both the isocyanate-reactive component and to the polyisocyanate component. Blowing agents may also be used in the form of an emulsion of the isocyanate-reactive component. Combinations of water and one or more auxiliary blowing agents are also suitable herein. In addition, water may be used as the sole blowing agent.

The amount of blowing agent or blowing agent mixture used may range between any combination of these upper and lower limits, inclusive, such as, for example, from 0.5 to 20% by weight, or from 0.75 to 10% by weight, based in each case on the total weight of the component (B). When water is the blowing agent, it is typically present in an amount of from 0.5 to 10% by weight, or from 0.75 to 7% by weight, based on the total weight of the component (B). The addition of water can be effected in combination with the use of the other blowing agents described.

Surfactants are preferably used to prepare the foams. Surfactants are known help to stabilize the foam until it cures. Suitable surfactants for the invention are those well known in the polyurethane industry. A wide variety of organosilicone surfactants are commercially available. Examples of suitable surfactants include DC-5043, DC-5164 and DC-5169, as well as Niax L-620, a product of Momentive Performance Materials, and Tegostab B8244, a product of Evonik-Goldschmidt. Many other silicone surfactants known to those in the art may be substituted for these suitable silicones. The amount of surfactant may range between any combination of upper and lower limits inclusive, such as, for example, of about 0.1 to 4, or about 0.2 to 3, parts per 100 parts of isocyanate-reactive mixture.

Other optional components that may be present in the flexible foam formulations include, for example, flame retardants, antioxidants, pigments, dyes, liquid and solid fillers, etc. Such commercial additives are included in the foams in conventional amounts when used.

The flexible foams are prepared using methods that are well known in the industry. These methods may include continuous or discontinuous free-rise slabstock foam processes and molded foam processes. In a typical slabstock process, the isocyanate is continuously mixed together with the other formulation chemicals by passing through a mixing head and then into a trough which overflows onto a moving conveyor. Alternatively, the reacting mixture is deposited directly onto the moving conveyor. In another embodiment, high pressure liquid carbon dioxide is fed into one or more of the formulation components, typically the polyol, entering into the mixing head and the resin blend is passed through a frothing device where the pressure is let down and the resultant froth is deposited onto the conveyor. The foam expands and rises as it moves down the conveyor to form a continuous foam slab that is cut into blocks or buns of the desired length for curing and storage. After curing for one or more days, these foam buns can be cut into the desired shapes for the end-use applications. In the discontinuous process, the reactants are quickly mixed together through a head or in a large mixing chamber. The reaction mixture is then deposited into a large box or other suitable container where foam expansion occurs to form a bun of the lateral dimensions of the container.

A typical molded foam process usually employs a one-shot approach in which a specific amount of the isocyanate stream (the "A" side) is rapidly combined and mixed with a specific amount of the remaining formulation components (the "B" side). An additional stream may be employed to bring in one or more specific components not included with the "B" side stream. The mixture is quickly deposited into a mold that is then closed. The foam expands to fill the mold and produce a part with the shape and dimensions of the mold.

In accordance with the present invention, the flexible foams are prepared at isocyanate indices ranges from 70 to 130, or from 80 to 120 or from 90 to 110. The term "isocyanate index", which may also be referred to as the NCO index, is defined herein as the ratio of reactive isocyanate groups (equivalents) to active hydrogen groups (equivalents), multiplied by 100%.

Although less preferred, a prepolymer approach to making the foams can also be used. In this approach, a significant portion of the isocyanate-reactive mixture is reacted with the polyisocyanate, and the resulting prepolymer is then reacted with the remaining components.

In a first embodiment, the invention is directed to a macromer comprising the reaction product of (a) a polyether dithiocarbonate polyol having an equivalent weight of 230 Da to 5600 Da, and functionality of 1 to 8, having a dithiocarbonate content of from 0.05% to 20% by weight, and which comprises the copolymerization product of a reaction mixture comprising (i) one or more starter polyether polyols having an equivalent weight less than 1000 Da, an OH number greater than 56 mg KOH/g polyol, and functionality of 1 to 8, (ii) an alkylene oxide, and (iii) carbon disulfide, in the presence of (iv) an alkoxylation catalyst; with optionally, (b) an ethylenically unsaturated compound containing hydroxyl reactive groups; optionally, in the presence of (c) a catalyst.

In a second embodiment, the invention is directed to the macromer according to the first embodiment in which (a) the polyether dithiocarbonate polyol has an equivalent weight of 280 Da to 5400 Da, a functionality of 2 to 7, a dithiocarbonate content of 0.10 to 15% by weight, and comprises the reaction product of (i) one or more starter polyether polyols having an OH number of at least 112 mg KOH/g polyol to 1850 mg KOH/g polyol, and a functionality of 2 to 7; (ii) the alkylene oxide comprises ethylene oxide and/or propylene oxide; and (iv) the alkoxylation catalyst comprises a double metal cyanide complex catalyst.

In a third embodiment, the invention is directed to the macromer according to the first or second embodiments in which (b) the ethylenically unsaturated compound containing hydroxyl reactive groups comprises methyl methacrylate, ethyl methacrylate, maleic anhydride, 3-isopropenyl-α,α-dimethyl benzyl isocyanate, 2-isocyanatoethyl methacrylate, adducts of isophorone diisocyanate and 2-hydroxyethyl methacrylate, adducts of toluene diisocyanate and 2-hydroxylpropyl acrylate, or mixtures thereof.

In a fourth embodiment, the invention is directed to the macromer according to one of the first to third embodiments in which the catalyst (c) comprises an organotin catalyst or a bismuth catalyst.

In a fifth embodiment, the invention is directed to a process for the preparation of a macromer which comprises (I) reacting (a) a polyether dithiocarbonate polyol having an equivalent weight of 230 Da to 5600 Da, and functionality of 1 to 8, having a dithiocarbonate content of from 0.05% to 20% by weight, and which comprises the copolymerization product of a reaction mixture comprising (i) one or more starter polyether polyols having an equivalent weight less than 1000 Da, an OH number greater than 56 mg KOH/g polyol, and functionality of 1 to 8, (ii) an alkylene oxide, and (iii) carbon disulfide, in the presence of (iv) an alkoxylation catalyst; with optionally, (b) an ethylenically unsaturated compound containing hydroxyl reactive groups; optionally, in the presence of (c) a catalyst.

In a sixth embodiment, the invention is directed to the process of preparing a macromer according to the fifth embodiment in which (a) the polyether dithiocarbonate polyol has an equivalent weight of 280 Da to 5400 Da, a functionality of 2 to 7, a dithiocarbonate content of 0.10 to 15% by weight, and comprises the reaction product of (i) one or more starter polyether polyols having an OH number of at least 112 mg KOH/g polyol to 1850 mg KOH/g polyol, and a functionality of 2 to 7; (ii) the alkylene oxide comprises ethylene oxide and/or propylene oxide; and (iv) the alkoxylation catalyst comprises a double metal cyanide complex catalyst.

In a seventh embodiment, the invention is directed to the process of preparing the macromer according to the fifth or sixth embodiments in which (b) the ethylenically unsaturated compound containing hydroxyl reactive groups comprises methyl methacrylate, ethyl methacrylate, maleic anhydride, 3-isopropenyl-α,α-dimethyl benzyl isocyanate, 2-isocyanatoethyl methacrylate, adducts of isophorone diisocyanate and 2-hydroxyethyl methacrylate, adducts of toluene diisocyanate and 2-hydroxylpropyl acrylate, or mixtures thereof.

In an eighth embodiment, the invention is directed to the process of preparing the macromer according to one of the fifth to seventh embodiments in which the catalyst (c) comprises an organotin catalyst or a bismuth catalyst.

In a ninth embodiment, the invention is directed to a preformed stabilizer which comprises the free-radical polymerization product of (1) a macromer according to one of the first to fourth embodiments; with (2) at least one ethylenically unsaturated monomer; in the presence of (3) a free-radical polymerization initiator; and, optionally, (4) a liquid diluent; and, optionally, (5) a polymer control agent.

In a tenth embodiment, the invention is directed to the preformed stabilizer according to the ninth embodiment in which (2) the ethylenically unsaturated monomer comprises styrene, acrylonitrile, or mixtures thereof.

In a eleventh embodiment, the invention is directed to the preformed stabilizer according to one of the ninth or tenth embodiments in which (3) the free-radical polymerization initiator comprises a peroxide initiator, an azo initiator or mixtures of peroxide and azo initiators.

In a twelfth embodiment, the invention is directed to the preformed stabilizer according to one of the ninth to eleventh embodiments in which (4) the diluent comprises isopropanol, a polyol having an OH number of 20 mg KOH/g polyol to 280 mg KOH/g polyol, or a mixture of a monol and a polyol.

In a thirteenth embodiment, the invention is directed to the preformed stabilizer according to one of the ninth to twelfth embodiments in which (5) the polymer control agent comprises isopropanol, toluene, ethylbenzene, dodecylmercaptan, carbon tetrachloride, carbon tetrabromide, chloroform, methylene chloride or a mixture thereof.

In a fourteenth embodiment, the invention is directed to a process for preparing a preformed stabilizer comprising (A) free-radically polymerizing (1) a macromer obtainable by a process according to one of the fifth through eighth embodiments; with (2) at least one ethylenically unsaturated monomer; in the presence of (3) a free-radical polymerization initiator; and, optionally, (4) a liquid diluent; and, optionally, (5) a polymer control agent.

In an fifteenth embodiment, the invention is directed to the process for preparing a preformed stabilizer according to the fourteenth embodiment in which (2) the ethylenically unsaturated monomer comprises styrene, acrylonitrile, or mixtures thereof.

In a sixteenth embodiment, the invention is directed to the process for preparing a preformed stabilizer according to one of the fourteenth or fifteenth embodiments in which (3) the free-radical polymerization initiator comprises a peroxide initiator, an azo initiator, or mixtures of peroxide and azo initiators.

In a seventeenth embodiment, the invention is directed to the process for preparing a preformed stabilizer according to one of the fourteenth to sixteenth embodiments in which (4) the diluent comprises isopropanol, a polyol having an OH number of 20 mg KOH/g polyol to 280 mg KOH/g polyol, or a mixture of a monol and a polyol.

In a eighteenth embodiment, the invention is directed to the process for preparing a preformed stabilizer according to one of the fourteenth to seventeenth embodiments in which (5) the polymer control agent comprises isopropanol, toluene, ethylbenzene, dodecylmercaptan, carbon tetrachloride, carbon tetrabromide, chloroform, methylene chloride or a mixture thereof.

In a nineteenth embodiment, the invention is directed to a polymer polyol comprising the in-situ, free-radical polymerization product of (A) a base polyol, (B) a component comprising at least one of: (1) a macromer according to one of the first to fourth embodiments; and (2) a preformed stabilizer according to one of the ninth to thirteenth embodiments; and (C) at least one ethylenically unsaturated monomer; in the presence of (D) a free-radical polymerization initiator; and, optionally, (E) a polymer control agent.

In a twentieth embodiment, the invention is directed to the polymer polyol according to the nineteenth embodiment in which the polymer polyol has a solids content of 20 to 70% by weight.

In a twenty-first embodiment, the invention is directed to the polymer polyol according one of the nineteenth to twentieth embodiments in which (A) the base polyol has a functionality of 2 to 8 and an OH number of 10 mg KOH/g polyol to 180 mg KOH/g polyol.

In a twenty-second embodiment, the invention is directed to the polymer polyol according to one of the nineteenth to twenty-first embodiments in which (C) the ethylenically unsaturated monomer comprises styrene, acrylonitrile, or mixtures thereof.

In a twenty-third embodiment, the invention is directed to the polymer polyol according to the twenty-second embodiment in which a mixture of styrene and acrylonitrile is present in a weight ratio of from 80:20 to 20:80.

In a twenty-fourth embodiment, the invention is directed to the polymer polyol according to one of the nineteenth to twenty-third embodiments in which (D) the free-radical initiator comprises a peroxide compound, an azo compound, or mixtures thereof.

In a twenty-fifth embodiment, the invention is directed to a process for preparing a polymer polyol comprising (I) free-radically polymerizing (A) a base polyol; (B) a compound comprising at least one of: (1) a macromer obtainable by a process according to one of the fifth to eighth embodiments; and (2) a preformed stabilizer obtainable by a process according to one of the fourteenth to eighteenth embodiments; and (C) at least one ethylenically unsaturated monomer; in the presence of (D) a free-radical polymerization initiator; and, optionally, (E) a polymer control agent.

In a twenty-sixth embodiment, the invention is directed to the process of preparing a polymer polyol according to the twenty-fifth embodiment in which the polymer polyol has a solids content of 20 to 70% by weight.

In a twenty-seventh embodiment, the invention is directed to the process of preparing a polymer polyol according to one of the twenty-fifth to twenty-sixth embodiments in which (A) the base polyol has a functionality of 2 to 8 and an OH number of 10 mg KOH/g polyol to 180 mg KOH/g polyol.

In a twenty-eighth embodiment, the invention is directed to the process of preparing a polymer polyol according to one of the twenty-fifth to twenty-seventh embodiments in which (C) the ethylenically unsaturated monomer comprises styrene, acrylonitrile, or mixtures thereof.

In a twenty-ninth embodiment, the invention is directed to the process of preparing a polymer polyol according to the twenty-eighth embodiment in which a mixture of styrene and acrylonitrile is present in a weight ratio of from 80:20 to 20:80.

In a thirtieth embodiment, the invention is directed to the process of preparing a polymer polyol according to one of the twenty-fifth to twenty-ninth embodiments in which (D) the free-radical initiator comprises a peroxide compound, an azo compound, or mixtures thereof.

In a thirty-first embodiment, the invention is directed to a polyurethane foam comprising the reaction product (I) a diisocyanate and/or polyisocyanate component, with (II) an isocyanate-reactive component comprising the novel polymer polyol according to one of the nineteenth to twenty-fourth embodiments, in the presence of (III) a catalyst, (IV) a blowing agent, and (V) a surfactant.

In a thirty-second embodiment, the invention is directed to a process for preparing a polyurethane foam which comprises reacting (I) a diisocyanate and/or polyisocyanate component, with (II) an isocyanate-reactive component comprising the novel polymer polyol obtainable by a process according to one of the twenty-fifth to thirtieth embodiments, in the presence of (Ill) a catalyst, (IV) a blowing agent, and (V) a surfactant.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the working examples.

Polyol 1: a propylene oxide adduct of sorbitol containing 12% ethylene oxide with a hydroxyl number of 33 mg KOH/g polyol Polyol 2: a propylene oxide adduct of glycerin containing a 20% ethylene oxide cap with a hydroxyl number of 36 mg KOH/g polyol and having a viscosity of 820 mPa·s Polyol 3: a propylene oxide adduct of glycerin with a hydroxyl number of 57 mg KOH/g polyol and having a viscosity of 465 mPa·s Polyol 4: a glycerin/sorbitol started polyether polyol containing about 81 to 82% of propylene oxide and about 17 to 18% of ethylene oxide, having an OH number of about 31.5 mg KOH/g polyol Starter Polyol 1 a propylene oxide adduct of sorbitol containing with a hydroxyl number of 143 mg KOH/g polyol Starter Polyol 2 a propylene oxide adduct of sorbitol containing with a hydroxyl number of 198 mg KOH/g polyol $CS_2$: carbon disulfide, commercially available from SigmaAldrich PCA: isopropanol, a polymer control agent TMI: isopropenyl dimethyl benzyl isocyanate (an unsaturated aliphatic isocyanate) which is commercially available as TMI® from Allnex Isocyanate A: a monomeric MDI comprising about 42% by weight of the 4,4'-isomer of MDI, about 57% by weight of the 2,4'-isomer of MDI and the balance being the 2,2'-isomer of MDI Isocyanate B: toluene diisocyanate comprising 80% by weight of the 2,4-isomer and 20% by weight of the 2,6-isomer, and having an NCO group content of 48.3%

TBPEH: tertiary-butylperoxy-2-ethylhexanoate

Initiator A: 2,2'-azobisisobutyronitrile, a free-radical polymerization initiator commercially available as VAZO 64 from E.I. Du Pont de Nemours and Co.

Initiator B: tertiary-amylperoxypivalate, a free radical polymerization initiator commercially available under the name Trigonox 125-C75 from AkzoNobel Catalyst A: a double metal cyanide catalyst commercially available from Covestro LLC Catalyst B: bismuth neodecanoate, commercially available under the name CosCat 83 from Vertellus Catalyst C: 70% by weight bis[2-dimethylaminoethyl]ether in 30% dipropylene glycol, an amine catalyst, commercially available from Momentive Performance Materials as NIAX A-1

Catalyst D: 33% by weight diazabicyclooctane in 67% by weight dipropylene glycol, an amine catalyst, commercially available from Momentive Performance Materials as NIAX A-33

Surfactant A: a silicon surfactant commercially available as DC5043 from Air Products DEOA-LF diethanolamine, a commercially available foam crosslinker/foam modifier that is commercially available from Air Products Viscosity: dynamic viscosities reported in mPa·s at 25° C.

Filtration: filterability was determined by diluting one part by weight sample (e.g. 200 grams) of polymer polyol with two parts by weight anhydrous isopropanol (e.g. 400 grams) to remove any viscosity-imposed limitations and using a fixed quantity of material relative to a fixed cross-sectional area of screen (e.g. 1⅛ in. diameter or 2.875 cm), such that all of the polymer polyol and isopropanol solutions passes by gravity through a 700-mesh screen. The 700-mesh screen is made with a Dutch twill weave. The actual screen used had a nominal opening of 30 microns. The amount of sample which passes through the screen within 600 seconds is reported in percent, a value of 100 percent indicates that over 99 weight percent passes through the screen.

Methods:

OH Number (Hydroxyl Number):

The OH numbers were determined according to ASTM D4274-11, and are reported in mg[KOH]/g[polyol].

Viscosity:

Viscosity was conducted on an Anton-Paar SVM 3000 viscometer at 25° C. that has been demonstrated to give equivalent results as can be generated with ASTM-D4878-15. The instrument was calibrated using mineral oil reference standards of known viscosity.

Gel Permeation Chromatography:

The number average and weight average, Mn and Mw, respectively, molecular weights were determined by gel-permeation chromatography (GPC) using a method based on DIN 55672-1, employing chloroform as the eluent with a mixed bed column (Agilent PL Gel; SDVB, 3 micron Pore diameter: 1×Mixed-E+5 micron Pore diameter: 2×Mixed-D), refractive index (RI) detection and calibrated with polyethylene glycol as the standard.

$^1$H-NMR:

The dithiocarbonate content was determined by dissolving the sample in deuterated chloroform and run on a 400 MHz nuclear magnetic resonance (NMR) (a Varian MR400) spectrometer employing high-resolution $^1$H-NMR for characterization.

Force-to-crush (FTC) was measured on the uncrushed 12 in.×12 in.×4 in. (30.5 cm×30.5 cm×10.2 cm) foam samples using a standard IFD test and 50 sq in. (322.6 sq. cm) indentor foot. The foam height was measured by lowering the foot slowly until a resistance of 0.5 lbs. (226.8 g) was detected. The foot was next forced into the foam at 20 in./min. (50.8 cm/min) to 25% of the measured height (75% compression) and the force immediately recorded. The foot was immediately returned to the initial foam height and a second compression cycle and force measure initiated. This process was repeated a third time to complete the measurement. Thus, three force measurements, $1^{st}$ cycle (FTC1), $2^{nd}$ cycle (FTC2), $3^{rd}$ cycle (FTC3) were obtained on each foam sample. The first measurement provides an indication of how much force is required to crush the foam initially, whereas the difference between the second (FTC2) and third (FTC3) values indicates how effective the initial crushing cycle was in opening the foam.

Polyol Preparation:

Preparation of Polyol 5:

A polyether polyol composition was prepared using the ingredients and amounts as shown in Table 1. To prepare the polyether polyol composition, the 1-L reactor was charged with the starter polyether polyol and Catalyst A at ambient temperature. The reactor temperature was raised to 130° C. and the starter mixture was de-watered using vacuum distillation with a slight nitrogen sparge through the starter mixture. The reactor was then sealed under vacuum at 130° C. and an initial amount of PO was dosed to the reactor equal to 10% by weight of the starter polyether. The pressure in the reactor was monitored until the pressure dropped 50% indicating the catalyst was active. Once the catalyst was determined to be active, the reactor temperature was lowered to 100° C. The PO feed was resumed at a rate sufficient to maintain the reaction pressure below 35 psig. When ~71% of the total weight of PO had been fed, the $CS_2$ feed was begun at a rate ~60% of the PO rate. Once the desired amount of CS$_2$ was fed, the PO feed was continued until the total amount of PO was fed. After completion of the PO addition, the reaction mixture was vacuum stripped at 130° C. to give Polyol 5 with a OH# of 33.7, a viscosity of 8091 mPa·s, and 1.3 wt. % CS$_2$ (as measured by NMR).

TABLE 1

Polyol 5

| Starter Polyol 1 (g) | Catalyst A (g) | PO (g) | CS$_2$ (g) | Final OH# (mg KOH/g polyol) | Final Viscosity (mPa · s) |
|---|---|---|---|---|---|
| 168 | 0.1404 | 553 | 30.0 | 33.7 | 8091 |

Preparation of Polyol 6:

A polyether polyol composition was prepared using the ingredients and amounts listed in Table 2. To prepare the polyether polyol composition, the 20 kg reactor was charged with the starter polyether polyol and Catalyst A at ambient temperature. The reactor temperature was raised to 130° C. and the starter mixture was de-watered using vacuum distillation with a slight nitrogen sparge through the starter mixture. The reactor temperature was lowered to 100° C. and the reactor was sealed under vacuum. An initial amount of PO was dosed to the reactor equal to 10% by weight of the starter polyether. The pressure in the reactor was monitored until the pressure dropped 50% indicating the catalyst was active. The PO and EO feed was begun at a rate sufficient to maintain the reaction pressure below 10 psig. When ~71% of the total weight of PO had been fed, the EO feed was stopped and the CS$_2$ feed was begun at a rate ~55% of the PO rate. Once the desired amount of CS$_2$ was fed, the PO feed was continued until the total amount of PO was fed. After completion of the PO addition, the reaction mixture was vacuum stripped at 130° C. The reactor was cooled to 90° C. and the reactor was charged with 7.2 g Irganox 1076 and agitated for 30 minutes to give Polyol 6 with a OH# of 32.6, a viscosity of 4413 mPa·s, and 2.5 wt % CS$_2$ (as measured by NMR).

TABLE 2

Polyol 6

| Starter Polyol 2 (g) | Catalyst A (g) | EO (g) | PO (g) | CS$_2$ (g) | Final OH# (mg KOH/g polyol) | Final Viscosity (mPa · s) |
|---|---|---|---|---|---|---|
| 2914 | 4.32 | 2165 | 12240 | 722 | 32.6 | 4413 |

Macromer Preparation:

Macromer A: prepared by heating a blend comprising 61% by weight of Polyol 1 and 39% by weight of Polyol 5, Isocyanate A (0.2 wt. %), and Catalyst B (100 ppm) at 75° C. for 2 hours. Calculated carbon disulfide content=0.6% by weight.

Macromer B: Polyol 6

Macromer C: prepared by heating a blend comprising 65% by weight of Polyol 1 and 35% by weight of Polyol 6, Isocyanate A (0.2 wt. %), and Catalyst B (100 ppm) at 75° C. for 2 hours. Carbon disulfide content=0.9% by weight.

Macromer D: a blend of 65% of Polyol 1 and 35% by weight of Polyol 6. Calculated carbon disulfide content=0.9% by weight.

Macromer E: prepared by heating Polyol 1 with TMI (0.6 wt. % by weight), Isocyanate A (0.2 wt. % by weight), and Catalyst B (100 ppm) at 75° C. for 4 hours.

Macromer F: a blend of 90% by weight of Macromer C and 10% by weight of Macromer E. Calculated carbon disulfide content=0.8% by weight.

Preformed Stabilizer (PFS) Preparation:

The preformed stabilizer was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120±5° C. The product from the second-stage reactor overflowed continuously through a pressure regulator designed to control the pressure in each stage at 65 psig. The product, i.e. the preformed stabilizer, then passed through a cooler and into a collection vessel. The preformed stabilizer formulation is disclosed in Table 3.

Preformed stabilizers A-F were prepared from Macromers A-F, respectively, using the following formulation:

TABLE 3

Preformed Stabilizer Composition

| Component | PFS |
|---|---|
| PCA type | Isopropanol |
| PCA, wt. % | 60.0% |
| Macromer, wt. % | 24.0% |
| Monomer, wt. % | 15.9% |
| Styrene/acrylonitrile weight ratio | 50:50 |
| TBPEH, wt. % | 0.1% |

Polymer Polyol Preparation:

This series of examples (Table 4) relates to the preparation of polymer polyols. The polymer polyols were prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The temperature of the reaction mixture was controlled at 115±5° C. The product from the second-stage reactor overflowed continuously through a pressure regulator designed to control the pressure in each stage at 45 psig. The product, i.e. the polymer polyol, then passed through a cooler and into a collection vessel. The crude product was vacuum stripped to remove volatiles. The wt. % total solids in the product was calculated from the concentrations of residual monomers measured in the crude polymer polyol before stripping.

TABLE 4A

FORMULATIONS FOR POLYMER POLYOLS

| Example | PMPO 1 | PMPO 2 | PMPO 3 | PMPO 4 | PMPO 5 |
|---|---|---|---|---|---|
| Polyol | 2 | 2 | 2 | 2 | 2 |
| Polyol (wt. % in fed) | 54.2 | 49.4 | 49.4 | 54.2 | 49.4 |
| Macromer B (wt. % in feed) | 0 | 0 | 0 | 0 | 0 |
| PFS | A | B | B | C | D |
| PFS (wt. % in feed) | 8.3 | 8.3 | 8.3 | 8.3 | 8.3 |
| Styrene (wt. % in feed) | 23.6 | 26.6 | 26.6 | 23.6 | 26.6 |
| Acrylonitrile (wt. % in feed) | 13.6 | 15.4 | 15.4 | 13.6 | 15.4 |
| Initiator | B | B | A | B | B |
| Initiator (wt/% in feed) | 0.25 | 0.25 | 0.29. | 0.25 | 0.25 |
| PCA (wt. % in feed) | 5.3 | 4.7 | 5.0 | 5.1 | 4.8 |
| Total Solids (wt. %) | 39.8 | 44.6 | 44.7 | 39.8 | 44.8 |
| Viscosity (mPa · s at 25° C.) | 5242 | 8946 | 13468 | 6122 | 7231 |
| Filterability - 700 mesh (%) | 100 | 100 | 29% | 100 | 100 |
| Mean Particle Size (microns) | 1.7 | 2.2 | 2.4 | 2.5 | 2.0 |

TABLE 4B

FORMULATIONS FOR POLYMER POLYOLS

| Example | PMPO 6 | PMPO 7 | PMPO 8 | PMPO 9* | PMPO 10 |
|---|---|---|---|---|---|
| Polyol | 2 | 2 | 2 | 2 | 3 |
| Polyol (wt. % in fed) | 49.4 | 49.4 | 48.4 | 49.4 | 74.0 |
| Macromer B (wt. % in feed) | 0 | 0 | 1.0 | 0 | 2 |
| PFS | D | F | E | E | |
| PFS (wt. % in feed) | 8.3 | 8.3 | 8.3 | 8.3 | 0 |
| Styrene (wt. % in feed) | 26.6 | 26.6 | 26.6 | 26.6 | 10.3 |
| Acrylonitrile (wt. % in feed) | 15.4 | 15.4 | 15.4 | 15.4 | 13.4 |
| Initiator | A | B | B | B | B |
| Initiator (wt/% in feed) | 0.29 | 0.29 | 0.25 | 0.25 | 0.32 |
| PCA (wt. % in feed) | 5.0 | 5.0 | 5.0 | 4.6 | 0 |
| Total Solids (wt. %) | 44.7 | 44.6 | 45.0 | 44.5 | 23.0 |
| Viscosity (mPa · s at 25° C.) | 14607 | 5861 | 5784 | 6339 | 1545 |
| Filterability - 700 mesh (%) | 235 | 100 | 100 | 100 | 100 |
| Mean Particle Size (microns) | 2.8 | 1.6 | 0.9 | 1.2 | 2.1 |

*Comparative example

General Procedure for Making Foams:

The foams in Table 5 were prepared by mixing the polyol, the surfactant, water, catalysts, and diethanolamine in a flask to create a master blend. Then, the desired amount of polymer polyol was added to a cup containing the desired amount of master blend. The contents of the cup were mixed for 55 seconds. The desired amount of Isocyanate component necessary to give an isocyanate index of 100 was added to the cup containing the master blend and polymer polyol mixture. The contents of the cup were mixed together for 5 seconds, and the reacting mixture was quickly poured into a 150° F. (65.5° C.) water-jacketed mold. After 4.5 minutes, the foam was removed from the mold, run through a cell-opening crushing device, and then placed in a 250° F. (121.1° C.) oven for 30 minutes to post cure. After 24 hours of aging in a controlled temperature and humidity laboratory, the foams were submitted for physical property testing. As can be seen in Table 5, the foam prepared from the inventive PMPO (Foam 2) had improved % Settle and Force-To-Crush values.

TABLE 5

Foam Formulations and Physical Properties

| | Foam 1* | Foam 2 |
|---|---|---|
| PMPO type | PMPO 9 | PMPO 5 |
| PMPO, pphp | 50 | 50 |
| Polyol 4, pphp | 50 | 50 |
| WATER, pphp | 3 | 3 |
| DEOA-LF, pphp | 1.73 | 1.73 |
| Surfactant A, pphp | 0.5 | 0.5 |
| Catalyst D, pphp | 0.24 | 0.24 |
| Catalyst C, pphp | 0.1 | 0.1 |
| Isocyanate B, pphp | 39.28 | 39.28 |
| INDEX | 100 | 100 |
| Foam Properties | | |
| % Settle | 3.6 | 2.6 |
| FTC1 | 280 | 300 |
| FTC2 | 88 | 97 |
| FTC3 | 50 | 60 |

*Comparative Example
** pphp: parts per hundred parts

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A macromer comprising the reaction product of:
   (a) a polyether dithiocarbonate polyol having an equivalent weight of 230 Da to 5600 Da, and functionality of 1 to 8, having a dithiocarbonate content of from 0.05% to 20% by weight, and which comprises the copolymerization product of a reaction mixture comprising
  (i) one or more starter polyether polyols having an equivalent weight less than 1000 Da, an OH number greater than 56 mg KOH/g polyol, and functionality of 1 to 8,
  (ii) an alkylene oxide, and
  (iii) carbon disulfide,
  in the presence of
  (iv) an alkoxylation catalyst;
with
  (b) an ethylenically unsaturated compound containing hydroxyl reactive groups;
optionally, in the presence of
  (c) at least one catalyst.

2. The macromer according to claim 1, wherein (a) said polyether dithiocarbonate polyol has an equivalent weight of 280 Da to 5400 Da, a functionality of 2 to 7, a dithiocarbonate content of 0.10 to 15% by weight, and comprises the reaction product of (i) one or more starter polyether polyols having an OH number of at least 112 mg KOH/g polyol to 1850 mg KOH/g polyol, and a functionality of 2 to 7; (ii) said alkylene oxide comprises ethylene oxide and/or propylene oxide; and (iv) said alkoxylation catalyst comprises a double metal cyanide complex catalyst.

3. The macromer according to claim 1, wherein (b) said ethylenically unsaturated compound containing hydroxyl reactive groups comprises methyl methacrylate, ethyl methacrylate, maleic anhydride, 3-isopropenyl-α,α-dimethyl benzyl isocyanate, 2-isocyanatoethyl methacrylate, adducts of isophorone diisocyanate and 2-hydroxyethyl methacrylate, adducts of toluene diisocyanate and 2-hydroxylpropyl acrylate, or mixtures thereof.

4. The macromer according to claim 1, wherein said catalyst (c) comprises an organotin catalyst or a bismuth catalyst.

5. A process for the preparation of a macromer comprising:
(1) reacting:
  (a) a polyether dithiocarbonate polyol having an equivalent weight of 230 Da to 5600 Da, and functionality of 1 to 8, having a dithiocarbonate content of from 0.05% to 20% by weight, and which comprises the copolymerization product of a reaction mixture comprising
    (i) one or more starter polyether polyols having an equivalent weight less than 1000 Da, an OH number greater than 56 mg KOH/g polyol, and functionality of 1 to 8,
    (ii) an alkylene oxide, and
    (iii) carbon disulfide,
    in the presence of
    (iv) an alkoxylation catalyst;
  with
    (b) an ethylenically unsaturated compound containing hydroxyl reactive groups;
  optionally, in the presence of:
    (c) at least one catalyst.

6. The process according to claim 5, wherein (a) said polyether dithiocarbonate polyol has an equivalent weight of 280 Da to 5400 Da, a functionality of 2 to 7, a dithiocarbonate content of 0.10 to 15% by weight, and comprises the reaction product of (i) one or more starter polyether polyols having an OH number of at least 112 mg KOH/g polyol to 1850 mg KOH/g polyol, and a functionality of 2 to 7; (ii) said alkylene oxide comprises ethylene oxide and/or propylene oxide; and (iv) said alkoxylation catalyst comprises a double metal cyanide complex catalyst.

7. The process according to claim 5, wherein (b) said ethylenically unsaturated compound containing hydroxyl reactive groups comprises methyl methacrylate, ethyl methacrylate, maleic anhydride, 3-isopropenyl-α,α-dimethyl benzyl isocyanate, 2-isocyanatoethyl methacrylate, adducts of isophorone diisocyanate and 2-hydroxyethyl methacrylate, adducts of toluene diisocyanate and 2-hydroxylpropyl acrylate, or mixtures thereof.

8. The process according to claim 5, wherein said catalyst (c) comprises an organotin catalyst or a bismuth catalyst.

* * * * *